United States Patent
Lu et al.

(10) Patent No.: US 12,542,148 B2
(45) Date of Patent: Feb. 3, 2026

(54) SYSTEMS AND METHODS FOR AUDIO SOURCE SEPARATION USING BAND-SPLIT TRANSFORMERS

(71) Applicant: Lemon Inc., Grand Cayman (KY)

(72) Inventors: Wei Tsung Lu, Los Angeles, CA (US); Ju-Chiang Wang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 224 days.

(21) Appl. No.: 18/241,138

(22) Filed: Aug. 31, 2023

(65) Prior Publication Data

US 2025/0078857 A1    Mar. 6, 2025

(51) Int. Cl.
*G10L 21/0308*    (2013.01)
*G10L 25/18*    (2013.01)
*G10L 25/30*    (2013.01)

(52) U.S. Cl.
CPC .......... *G10L 21/0308* (2013.01); *G10L 25/18* (2013.01); *G10L 25/30* (2013.01)

(58) Field of Classification Search
CPC ..... G10L 21/0308; G10L 25/18; G10L 25/30; G10L 19/0212; G10L 19/022; G10L 25/24

See application file for complete search history.

(56) References Cited

U.S. PATENT DOCUMENTS

| | | | | |
|---|---|---|---|---|
| 11,978,473 | B1* | 5/2024 | Samuels | G10L 25/51 |
| 2021/0374517 | A1* | 12/2021 | Enguehard | G06N 3/045 |
| 2023/0021336 | A1* | 1/2023 | Troxler | G06N 5/022 |
| 2023/0073154 | A1* | 3/2023 | Paxton | G06F 40/30 |
| 2023/0207064 | A1* | 6/2023 | Hamp | G16B 20/40 |
| | | | | 706/12 |

(Continued)

OTHER PUBLICATIONS

Lou et al.; "Music Source Separation with Band-split RNN"; Audio and Speech Processing; arXiv:2209.1517; Sep. 2022; 10 pages.

(Continued)

*Primary Examiner* — Michael N Opsasnick
(74) *Attorney, Agent, or Firm* — BakerHostetler

(57) ABSTRACT

The present disclosure describes techniques for implementing improved audio source separation. A complex spectrum X is split into a plurality of K bands along a frequency axis by applying band-split operations on the complex spectrum X. The complex spectrum is a time-frequency representation of audio signals. Each of the plurality of K bands is denoted as $X_k$, k=1, ..., K. Each band $X_k$ comprises one or more frequency bins. Each individual multilayer perceptron is applied to each band $X_k$ to extract latent representations and obtain outputs $H_k^0$. A time-domain transformer and a frequency-domain transformer are applied on a stacked representation $H^0$. Time-domain and frequency-domain transformers are repeatedly applying in an interleaved manner for L times to obtain $H^L$ output from the transformer blocks. The $H^L$ is input into a multi-band mask estimation sub-model. A complex ideal ratio mask is generated based on outputs from the multi-band mask estimation sub-model.

17 Claims, 11 Drawing Sheets

(56) References Cited

U.S. PATENT DOCUMENTS

| | | | | |
|---|---|---|---|---|
| 2023/0316055 | A1* | 10/2023 | Chowdhery | G06N 3/0499 |
| | | | | 706/16 |
| 2024/0127586 | A1* | 4/2024 | Brock | G06N 3/047 |
| 2024/0194213 | A1* | 6/2024 | Wichern | G10L 25/21 |
| 2024/0419382 | A1* | 12/2024 | Dekel | G06V 20/70 |

OTHER PUBLICATIONS

Rouard et al.; "Hybrid Transformers for Music Source Separation"; IEEE Int'l Conf. on Acoustics, Speech and Signal Processing; 2023; 5 pages.

Chen et al.; "Dual-Path Transformer Network: Direct Context-Aware Modeling for End-to-End Monaural Speech Separation"; Audio and Speech Processing; arXiv:2007.13975; Aug. 2020; 5 pages.

Rafii et al.; "An Overview of Lead and Accompaniment Separation in Music"; IEEE ACM Transactions on Audio, Speech, and Language Processing; vol. 26; 2018; 30 pages.

Mitsufuji et al.; "Music Demixing Challenge 2021"; Frontiers in Signal Processing; vol. 1; Jan. 2022; 14 pages.

Schedl et al.; "Music Information Retrieval: Recent Developments and Applications"; Foundation and Trends in Information Retrieval; vol. 8; 2014; p. 127-261.

Nakano et al.; "Joint Singing Pitch Estimation and Voice Separation Based on a Neural Harmonic Structure Renderer"; IEEE Workshop on Applications of Signal Processing to Audio and Acoustics; 2019; p. 155-159.

Lin et al.; "A Unified Model for Zero-shot Music Source Separation, Transcription and Synthesis"; ISMIR; arXiv:2108.03456; 2021; 8 pages.

Grais et al.; "Deep neural networks for single channel source separation"; IEEE Int'l Conf. on Acoustics, Speech and Signal Processing; 2014; p. 3734-3738.

Chandna et al.; "Monoaural Audio Source Separation Using Deep Convolutional Neural Networks"; Int'l Conf. on Latent Variable Analysis and Signal Separation; 2017; p. 258-266.

Kong et al.; "Decoupling Magnitude and Phase Estimation with Deep ResUNet for Music Source Separation"; Sound, Audio and Speech Processing; arXiv:2109.05418; 2021; 8 pages.

Jansson et al.; "Singing voice separation with deep U-Net convolutional networks"; 18$^{th}$ Int'l Society for Music Information Retrieval Conf.; Oct. 2017; p. 745-751.

Uhlich et al.; "Improving music source separation based on deep neural networks through data augmentation and network blending"; IEEE Int'l Conf. on Acoustics, Speech and Signal Processing; 2017; p. 261-265.

Liu et al.; "Channel-wise Subband Input for Better Voice and Accompaniment Separation on High Resolution Music"; Interspeech; arXiv:2008.05216; 2020; 5 pages.

Luo et al.; "Music Source Separation with Band-split RNN"; Audio and Speech Processing; arXiv:2209.15174; 2022; 10 pages.

Vaswani et al.; "Attention is All you Need"; 31$^{st}$ Conf. on Advances in Neural Information Processing Systems; 2017; 11 pages.

Luo et al.; "Conv-TasNet: Surpassing Ideal Time-Frequency Magnitude Masking for Speech Separation"; IEEE/ACM Transactions on Audio, Speech and Language Processing; vol. 27 No. 8; Aug. 2019; p. 1256-1266.

Defossez et al.; "Music Source Separation in the Waveform Domain"; Audio and Speech Processing; arXiv:1911.13254; 2021; 16 pages.

Defossez et al.; "Demucs: Deep Extractor for Music Sources with extra unlabeled data remixed"; Audio and Speech Processing; arXiv:1909.01174; 2019; 12 pages.

Kim et al.; "Sound Demixing Challenge 2023 Music Demixing Track Technical Report: TFC-TDF-UNet v3"; Sound; arXiv:2306.09382; 2023; 5 pages.

Dosovitskiy et al.; "An Image is Worth 16x16 Words: Transformers for Image Recognition at Scale"; Computer Vision and Pattern Recognition; arXiv:2010.11929; 2021; 22 pages.

Wang et al.; "Supervised Speech Separation Based on Deep Learning: An Overview"; IEEE/ACM Transactions on Audio, Speech and Language Processing; vol. 26; 2018; 28 pages.

Zhang et al.; "Root Mean Square Layer Normalization"; 33$^{rd}$ Conf. on Neural Information Processing Systems; 2019; 12 pages.

Isik et al.; "PoCoNet: Better Speech Enhancement with Frequency-Positional Embeddings, Semi-Supervised Conversational Data, and Biased Loss"; Audio and Speech Processing; arXiv:2008.04470; 2020; 5 pages.

Dauphin et al.; "Language Modeling with Gated Convolutional Networks"; 34$^{th}$ Int'l Conf. on Machine Learning; 2017; 9 pages.

Rafii et al.; "MUSDB18—a corpus for music separation"; HAL; 2017; 3 p. (abstract only see pp. 2 and 3).

Vincent et al.; "Performance measurement in blind audio source separation"; IEEE Transactions on Audio, Speech and Language Processing; vol. 14; 2006; p. 1462-1469.

Loshchilov et al.; "Decoupled Weight Decay Regularization"; Machine Learning; arXiv:1711.05101; 2019; 19 pages.

* cited by examiner

Algorithm 1 Interleaved Transformers along time and frequency axes.

1: Input: $H^l$ with a shape of $B \times T \times K \times D$
2: Permute $H^l$ to $(B \times K) \times T \times D$
3: Apply a Transformer along the $T$ axis.
4: Rearrange the above to $(B \times T) \times K \times D$
5: Apply a Transformer along the $K$ axis.
6: Output: Permute the above output to $H^{l+1}$ with a shape of $B \times T \times K \times D$.

```
┌─────────────────────────────────────────────────────────────────────────┐
│ Generating a complex ideal ratio mask (cIRM) based on outputs from a    │
│ multi-band mask estimation sub-model, wherein the cIRM enables to       │
│ separate audio signals based on sound sources 602                       │
└─────────────────────────────────────────────────────────────────────────┘
                                    ↓
┌─────────────────────────────────────────────────────────────────────────┐
│ Generate at least one separated spectrum based on multiplying the cIRM  │
│ by an input complex spectrum X 604                                      │
└─────────────────────────────────────────────────────────────────────────┘
                                    ↓
┌─────────────────────────────────────────────────────────────────────────┐
│ Recover at least one separated signal in the time domain by applying an │
│ inverse short time Fourier transform (iSTFT) to the at least one        │
│ separated spectrum 606                                                  │
└─────────────────────────────────────────────────────────────────────────┘
```

Split a complex spectrum X into a plurality of K bands along a frequency axis by applying band-split operations on the complex spectrum X, wherein the spectrum is a time-frequency representation of audio signals, wherein each of the plurality of K bands is denoted as $X_k$, k=1, ..., K, and wherein each band $X_k$ comprises one or more frequency bins 802

Apply an individual multilayer perceptron (MLP) to each band $X_k$ to extract latent representations and obtain outputs $H_k^0$, wherein 0 indicates 0-th layer input to transformer blocks 804

Insert frequency of time positional encodings to the transformer blocks such that the transformer blocks are aware of information of different frequency bins 806

Apply a time-domain transformer and a frequency-domain transformer on a stacked representation $H^0$, and repeatedly apply time-domain and frequency-domain transformers in an interleaved manner for L times to obtain $H^L$ output from the transformer blocks 808

Input the $H^L$ into a multi-band mask estimation sub-model 810

Generate a complex ideal ratio mask (cIRM) by concatenating outputs from the multi-band mask estimation sub-model along the frequency axis, wherein the multi-band mask estimation sub-model comprises K individual MLP layers, and wherein each of the K individual MLP layer comprises a RMSNorm layer, a fully connected layer followed by a Tanh activation, and a fully connected layer followed by a gated linear unit (GLU) layer 812

FIG. 8

Table 1. SDRs of BS-Transformer and other MSS systems.

| | Vocals | Bass | Drums | Other | Avg. |
|---|---|---|---|---|---|
| UNet | | | | | |
| ResUNet | | | | | |
| BSRNN | 10.01 | 7.22 | 9.01 | 6.70 | 8.24 |
| BSRNN (semi-sup) | 10.47 | 8.16 | 10.15 | 7.08 | 8.97 |
| Sparse HT Demucs (finetuned) | 9.37 | 10.47 | 10.83 | 6.41 | 9.27 |
| BSTransformer - small | 10.80 | 11.40 | 9.53 | 7.81 | 9.89 |
| BSTransformer | 12.72 | 13.32 | 12.91 | 9.01 | 11.99 |

FIG. 9

SYSTEMS AND METHODS FOR AUDIO SOURCE SEPARATION USING BAND-SPLIT TRANSFORMERS

BACKGROUND

Audio source separation aims to extract one or more source signals of interest from an audio recording containing a mixture of multiple sound sources. This technology plays an essential role in the success of hearing aids, hands-free phones, voice command and other noise-robust audio analysis systems, and music post-production software. Thus, improvements in audio source separation are desired.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 shows an example algorithm in accordance with the present disclosure.

FIG. 6 shows an example process for implementing audio source separation in accordance with the present disclosure.

FIG. 8 shows an example process for implementing audio source separation in accordance with the present disclosure.

FIG. 9 shows an example table of signal-to-distortion ratio scores illustrating improved audio source separation using techniques in accordance with the present disclosure.

DETAILED DESCRIPTION OF ILLUSTRATIVE EMBODIMENTS

Figure 1:
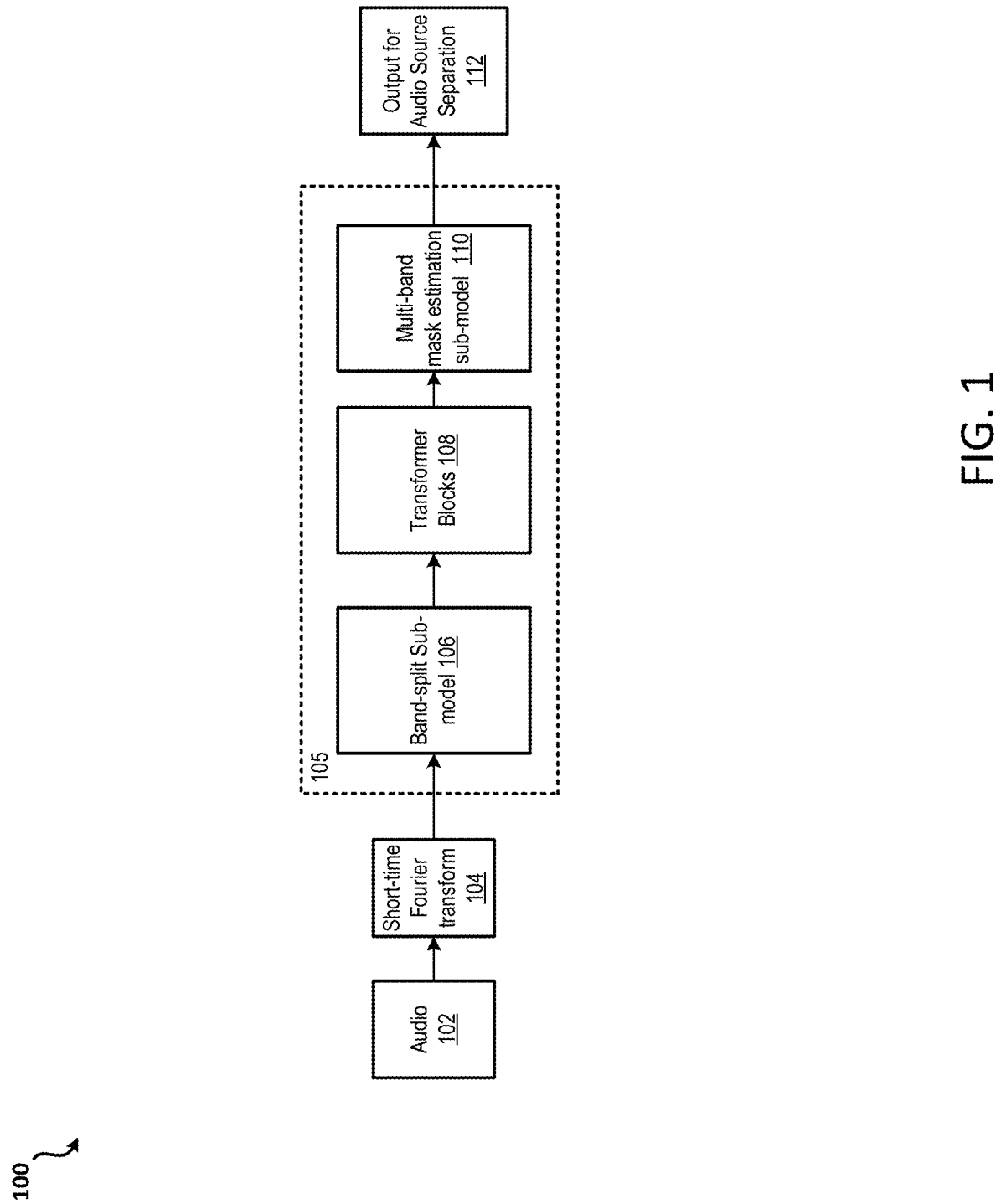
FIG. 1 shows an example system for implementing audio source separation in accordance with the present disclosure.

Audio source separation aims to extract one or more source signals of interest from an audio recording containing a mixture of multiple sound sources. When applying audio separation technology to music recordings, users are interested in separating the audio into multiple musically distinct audio stems. This task is called Music Source Separation (MSS). MSS may be used, for example, to separate a musical recording into different instruments, such as vocals, bass, drums, etc. MSS is an essential task for music information retrieval (MIR), and has several applications in downstream MIR tasks, such as vocal pitch estimation, music transcription, and/or the like. MSS also has many industrial applications. For example, MSS may be used to separate a piece of music into vocals and accompaniment for music editing and creation.

Neural networks may be used to accomplish MSS tasks. The MSS systems may use either frequency-domain methods or time-domain methods to source-separate audio. The MSS systems that use the frequency-domain methods may first transform an audio recording into a representation (e.g., a complex spectrum). Then, fully connected neural networks, convolutional neural networks (CNNs), or recurrent neural networks (RNNs) may be applied on the complex spectrum. The high and low frequency signals have different patterns, but such frequency-domain methods often apply the same kernels across all frequencies. Such methods are unable to capture the different frequency patterns of signals. As such, improved techniques for audio source separation are desirable.

Described herein are improved techniques for audio source separation. The techniques described herein can separate both the magnitude and phase information of the target source(s). The system described herein may be referred to as a band-split Transformer with Rotary Position Encoding (BS-RoFormer). First, the BS-RoFormer system provides improvements over the existing methods by splitting the representation (e.g., complex spectrum) of audio into finer subbands. Each subband may be input into individual multilayer perceptron (MLP) layers to extract latent representations. Second, the BS-RoFormer system uses band-split Transformer blocks to replace the RNNs found in existing methods. Transformer blocks have better representation ability than RNNs in natural language and vision tasks. Third, the BS-RoFormer system uses interleaved Transformers along the frequency axis and the time axis to capture audio information from different aspects. Fourth, the BS-RoFormer uses the Rotary Position Encoding (RoPE) method for each Transformer in the Transformer blocks. RoPE has better position encoding ability in natural language tasks. The time and frequency positional encodings may be explicitly inserted into each Transformer so that the BS-RoFormer system is aware of the different time steps and frequency bands. The BS-RoFormer system outperforms the existing audio source separation systems by a large margin.

FIG. 1 illustrates an example system 100 in accordance with the present disclosure. The system 100 may be used for implementing audio source separation. The system 100 may comprise a BS-RoFormer system 105. The BS-RoFormer system 105 may comprise a band-split sub-model 106, transformer blocks 108, and a multi-band mask estimation sub-model 110.

Audio 102 may comprise any piece of audio. The piece of audio may comprise a piece of music audio (e.g., music recording). The piece of music audio may comprise a song or a portion of a song. The piece of music audio may comprise vocals and/or a plurality of different instrumental sounds. The vocals may represent a human voice (e.g., singing and/or talking). Each of the plurality of different instrumental sounds may correspond to a different instrument featured in the piece of music audio. The instruments may comprise one or more of a guitar, a piano, drums, bass, cello, violin, piccolo, flute, trumpet, harmonica, xylophone, saxophone, harp, and/or any other instruments. A short time Fourier transform (STFT) 104 may be configured to transform the audio 102 into a time-frequency representation, such as a complex spectrum or a two dimensional spectrogram. The STFT is a Fourier-related transform used to determine the sinusoidal frequency and phase content of local sections of a signal as it changes over time. The time-frequency representation may herein be referred to as "X."

The band-split sub-model 106 may receive the time-frequency representation as input. The time-frequency representation is not homogeneous over different frequency bins. For example, the frequency patterns of an instrument in the low frequency bin and an instrument in the high frequency bin may be different. As such, unlike previous MSS systems that directly apply neural networks on the time-frequency representation, the band-split sub-model 106 may apply band-split operations on the time-frequency representation. The band-split sub-model 106 may be configured to project the time-frequency representation into multiple subband representations according to a predetermined mapping scheme. The mapping scheme may indicate which frequency bins should be grouped into a subband. The mapping scheme may comprise a mel-band or hand-crafted mapping, with or without frequency overlaps. For example, the band-split sub-model 106 may be configured to split the time-frequency representation into K uneven subbands along the frequency axis. Each subband may herein be referred to as "$X_k$", k=1, . . . , K.

The band-split sub-model 106 may be configured to apply individual multilayer perceptron (MLP) layers to each subband. A MLP is a modern feedforward artificial neural network, comprising fully connected neurons with a non-linear kind of activation function, organized in at least three layers (e.g., MLP layers). The MLP is able to distinguish data that is not linearly separable. Each MLP layer may comprise a Root Mean Square Normalization (RMSNorm) layer followed by a linear layer. Each RMSNorm layer may regularize the summed inputs to a neuron in one layer according to root mean square (RMS), giving the model re-scaling invariance property and implicit learning rate adaptation ability. The output of each transformed subband may be fed into the transformer blocks 108.

The transformer blocks 108 may receive the output from the band-split sub-model 106. The transformer blocks 108 may alternate self-attention computation along the time-axis and the frequency-axis. For example, the transformer blocks 108 may decompose computation along different dimensions. Time-domain transformer(s) and frequency-domain transformer(s) may be applied along the time (T) axis and the frequency axis (e.g., the K axis) in an interleaved manner. The transformer along the T axis and the transformer along the K axis may have the same architecture. Each transformer may comprise an attention module and a feed-forward module.

In embodiments, the transformer blocks 108 may comprise a stack of transformer blocks. The stack may comprise L transformer blocks. Each transformer block may comprise a time-domain transformer and the frequency-domain transformer. The stack of L transformer blocks may alternate self-attention computation along the time-axis and the frequency-axis by applying time-domain transformers and frequency-domain transformers in an interleaved manner. In other embodiments, the transformer blocks 108 may comprise a time-domain transformer and a frequency-domain transformer. The time-domain transformer and the frequency-domain transformer may be applied in an interleaved manner for L times. The output of the transformer blocks 108 (hereinafter referred to as "$H^L$") may have a shape of T×K×D and may be fed into the multi-band mask estimation sub-model 110.

The multi-band mask estimation sub-model 110 may receive the $H^L$. The multi-band mask estimation sub-model 110 may be configured to project each subband representation into corresponding subband frequencies. If two subbands are overlapping, their resulting subband estimations may be averaged. The multi-band mask estimation sub-model 110 may apply K individual MLP layers to the $H^L$. Each MLP layer may comprise a RMSNorm layer, a fully connected layer followed by a Tan h activation, and a fully connected layer followed by a gated linear unit (GLU) layer. The output of the k-th MLP layer of the multi-band mask estimation sub-model may have a shape of $(2×C)×T×F_k$. The number 2×C indicates that each channel contains a real value and an imaginary value. All the outputs may be concatenated along the frequency axis and combined to generate output 112. The output 112 may comprise linear spectrums, ideal binary masks (IBMs), ideal ratio mask (IRMs), and/or complex IRMs (cIRMs). For example, the output 112 may comprise a cIRM $\hat{M}$ with a shape of C×T×F. The output 112 enables to separate the audio 102 based on sound sources. The BS-RoFormer system 105 is discussed in more detail below with regard to FIG. 2.

Figure 2:
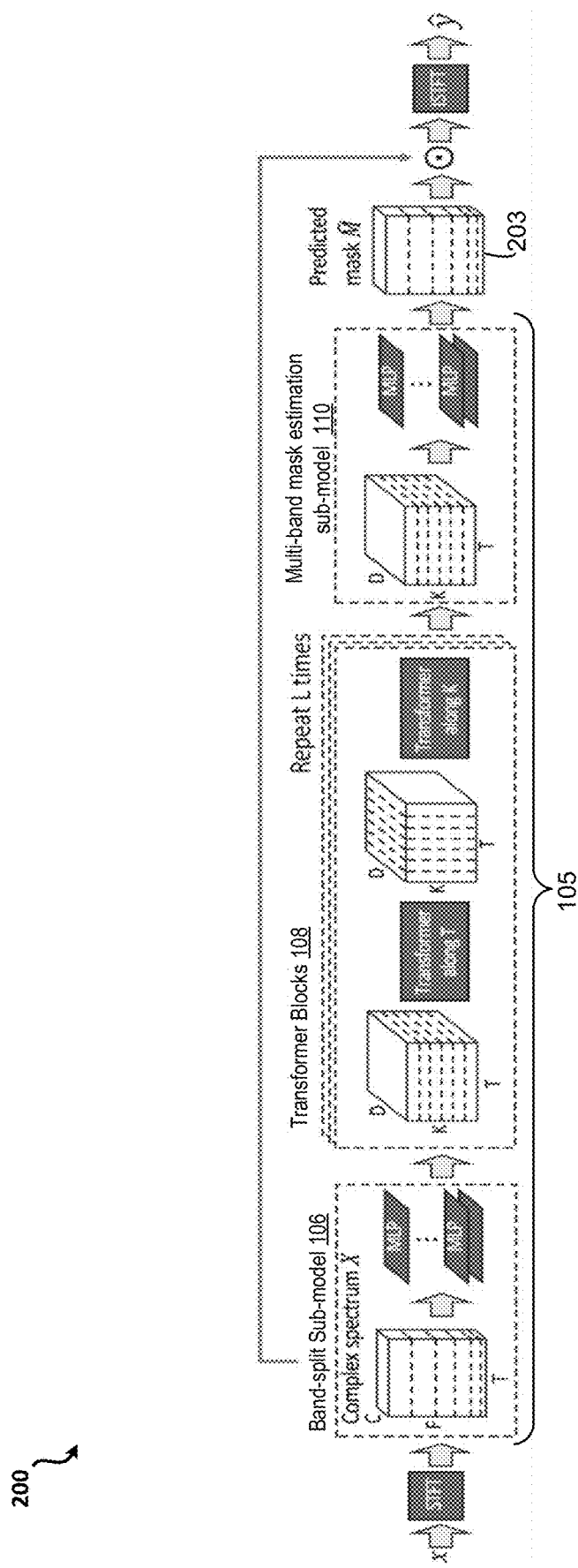
FIG. 2 shows an example system for implementing audio source separation in accordance with the present disclosure.

FIG. 2 shows an example system 200 for implementing audio source separation. The system 200 comprises the BS-RoFormer system 105. A piece of audio (e.g., music, audio signal, etc.) may be represented by a waveform. The waveform of the input mixture may herein be referred to as "x", with $x \in \mathbb{R}^{C \times L}$. C may represent the number of channels and L may represent the length of the audio signal. If the piece of audio is a mono recording (e.g., the piece of audio was recorded utilizing one microphone on one channel), C may equal 1. If the piece of audio is a stereo recording (e.g., the piece of audio was recorded utilizing two microphones on two different channels), C may equal 2. The waveform x may be transformed into a time-frequency representation, such as a complex spectrum, by a short time Fourier transform (STFT). As explained above with regard to FIG. 1, the time-frequency representation may herein be referred to as "X", with $X \in \mathbb{C}^{C \times T \times F}$. T and F may represent the number of frames and the number of frequency bins, respectively.

The time-frequency representation (e.g., complex spectrum) X may be input into the BS-RoFormer system 105. The BS-RoFormer system 105 may comprise a frequency-domain neural network. The BS-RoFormer system 105 may be herein referred to as $f_\theta$. The BS-RoFormer system 105 may be modeled by a set of learnable parameters θ.

Unlike existing MSS systems that would directly apply neural networks on the complex spectrum X, the BS-RoFormer system 105 may apply band-split operations on X. X is not homogeneous over different frequency bins. For example, the frequency patterns of an instrument in the low frequency bin and an instrument in the high frequency bin are different. The band-split sub-module 106 may split X into K uneven subbands along the frequency axis. As described above with regard to FIG. 1, the subbands may herein be referred to as "$X_k$" with $X_k \in \mathbb{C}^{C \times T \times F_k}$, where $F_k$ is the number of frequency bins in the k-th band. All subbands $X_k$ may constitute the entire complex spectrum X and $\Sigma_{k=1}^{K} F_k = F$. More subbands may improve the performance of the BS-RoFormer system 105.

The band-split sub-module 106 may apply individual MLPs to each subband $X_k$. Each MLP may comprise a RMSNorm layer. The RMSNorm layer may be followed by a linear layer. The RMSNorm layer may regularize the summed inputs to a neuron in one layer according to root mean square. RMSNorm is an efficient improvement to the LayerNorm normalization, which directly estimates the normalization statistics from the summed inputs to the neurons within a hidden layer so the normalization does not introduce any new dependencies between training cases. The k-th linear layer may comprise a learnable matrix. The learnable matrix may have a shape of $(C×F_k)×D$ and a learnable bias with a shape of D. The output of each transformed band may herein be referred to as "$H_k^0$," with shapes of T×D, where the superscript 0 indicates that $H_k^0$ is the 0-th layer input to the later transformer blocks. All $H_k^0$, k=1, ..., K may be stacked along the frequency dimension to obtain a stacked $H^0$ with a shape of T×K×F. The stacked $H^0$ may be input into the transformer blocks 108.

The transformer blocks 108 may receive the output representation $H_k^0 \in \mathbb{R}^{T \times K \times D}$ from the band-split sub-module 106. The transformer blocks 108 may receive $H_k^l \in \mathbb{R}^{T \times K \times D}$ as input. To construct the transformer, T×K may be used as the sequence length. However, this may lead to the complexity of the system $T^2 \times K^2$ which is intractable. To address this problem, computation may be decomposed along different dimensions. To decompose computation along different dimensions, two transformers may be applied: one may be applied along the T axis, and another may be applied along the K axis. One advantage of the decomposed transformer operation is that global information may be captured while reduce the computational complexity from $T^2 \times K^2$ to $T^2 \times K + K^2 \times T$. Further, the band-split sub-module 106 may reduce the time complexity by reducing the dimension along the frequency axis from I to K.

In embodiments, the transformer blocks 108 may comprise a stack of transformer blocks. The stack may comprise L transformer blocks. Each transformer block may comprise a time-domain transformer and the frequency-domain transformer. Each transformer block may receive $H_k^l \in \mathbb{R}^{T \times K \times D}$ as input, l=1, ..., L. The stack of L transformer blocks may alternate self-attention computation along the time-axis and the frequency-axis by applying, in an interleaved manner, time-domain transformers and frequency-domain transformers on respective input. In other embodiments, the transformer blocks 108 may comprise a time-domain transformer and a frequency-domain transformer. The time-domain transformer and the frequency-domain transformer may be applied in an interleaved manner for L times.

The transformer applied along the time axis (i.e., T axis) and the transformer applied along the frequency axis (e.g., K axis) may have the same architecture. The architecture of the transformer applied along the T axis and the transformer applied along the K axis involves two steps of sequence modeling, which alternates the self-attention between the frequency-axis and time-axis.

Figure 3:
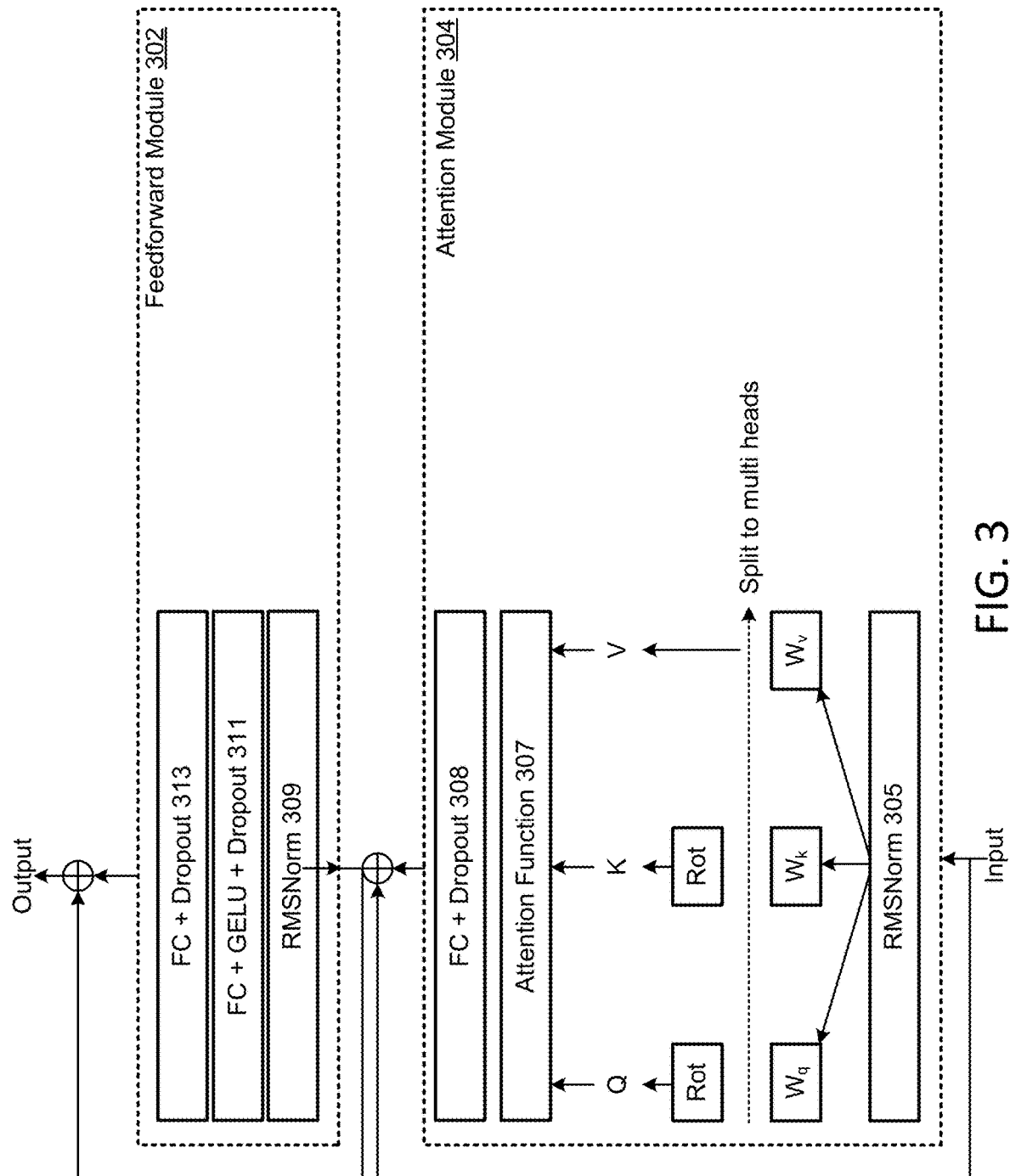
FIG. 3 shows an example transformer layer in accordance with the present disclosure.

FIG. 3 shows an example transformer architecture 300. The transformer architecture 300 may comprise an attention module 304 and a feedforward module 302. An attention module may be used to make a CNN learn and focus more on the important information, rather than learning non-useful background information. The attention module 304 may first input the input tensor with a shape of B×L×D into a RMSNorm module 305. The output of the RMSNorm module 305 may be fed into query, key, value layers. The query, key, value layers may be modeled by fully connected layers $W_q$, $W_k$, $W_v$, respectively. The output of the query, key, value layers may be denoted by Q, K, V, respectively. The fully connected layers $W_q$, $W_k$, $W_v$ may all have shapes of D×H, where H is the hidden dimension. Then, Q, K, V may be split into multiple heads.

In modeling the spectrogram, the positions of the frequency and time are important, as different time and frequency positions contain different information. To integrate the position information into our system, rotary embedding may be used on Q and K. Rotary embedding is a type of position embedding that encodes absolute positional information with rotation matrix and naturally incorporates explicit relative position dependency in self-attention formulation. Rotary embedding has the advantage of capturing both absolute and relative information of the sequence.

Then, the Q, K, and V values may be input to an attention function 307. The attention function 307 may be represented as follows:

$$\text{output} = \text{Dropout}\left(\text{Softmax}\left(\frac{QK^T}{\sqrt{d_k}}\right)\right) V.$$

While the attention module 304 is a core part of the BS-RoFormer system 105, the calculation of this attention is slow. As such, flash attention may be adopted into the BS-RoFormer system 105. Then, a fully connected layer 308 with Dropout may be used. Dropout refers to the practice of disregarding certain nodes in a layer at random during training. A dropout is a regularization approach that prevents overfitting by ensuring that no units are codependent with one another. After building the attention module 304, a residual summation may be applied between the input and the attention module 304.

The feedforward module 302 may receive, as input, the output of the attention module 304. As FIG. 3 shows, the feedforward module 302 comprises a RMSNorm layer 309, a first fully connected layer 311, and a second fully connected layer 313. The first fully connected layer 311 may comprise GeLU activation and a Dropout. GeLU is a function that multiplies its input by the cumulative density function of the normal distribution at this input. The second fully connected layer 313 may comprise a Dropout. A residual addition may be applied between the input and the output of the feedforward module 302. $H^L$ FIG. 4 shows an example algorithm 400 for applying interleaved transformers along the time and frequency axes. The first step of the algorithm 400 may comprise inputting $H^l$ with a shape of B×T×K×D. The second step of the algorithm 400 may comprise permuting $H^l$ to (B×K)×T×D. A transformer may then be applied on the permuted $H^l$ along the time axis (i.e., T axis). The fourth step of the algorithm 400 may comprise rearranging the input to (B×T)×K×D. Then a transformer may be applied on the rearranged $H^l$ along the K axis. The sixth step of the algorithm 400 may comprise permuting the output to $H^{l+1}$ with a shape of B×T×K×D. The final output of the transformer blocks 108 (hereinafter referred to as "$H^L$") may have a shape of T×K×D and may be fed into the multi-band mask estimation sub-model 110.

The multi-band mask estimation sub-model 110 may receive the output of the transformer blocks 108. Similar to the band-split operation performed by the band-split sub-module 106, the multi-band mask estimation sub-model 110 may apply K individual MLP layers to each subband output $H_k^l$. Each MLP layer may comprise a RMSNorm layer, a fully connected layer followed by a Tan h activation, and a fully connected layer followed by a gated linear unit (GLU) layer. The output of the k-th MLP layer may have a shape of (2×C)×T×$F_k$. The number 2×C indicates that each channel contains a real value and an imaginary value. All the outputs may be concatenated along the frequency axis and combined to generate the output of the BS-RoFormer system 105.

The output of the BS-RoFormer system 105 may comprise one or more of linear spectrums, ideal binary masks (IBMs), ideal ratio mask (IRMs), or complex IRMs (cIRMs). For example, the output of the BS-RoFormer system 105 may comprise a predicted mask 203. The predicted mask may comprise a cIRM denoted as $\hat{M} \in \mathbb{C}^{C \times T \times F}$ (e.g., M with a shape of C×T×F). The output of the BS-RoFormer system 105 (e.g., $\hat{M}$) may be multiplied by the input complex spectrum X to generate the separated complex spectrum $\hat{Y}$, where $\hat{Y}=\hat{M}\odot X$. An inverse STFT (iSTFT) may be applied to $\hat{Y}$ to recover the separated signal $\hat{y}$ in the time domain.

During a process of training the BS-RoFormer system 105, the mean absolute error (MAE) loss between the time domain ground truth signal y and the predicted signal $\hat{y}$ may be calculated as follows:

$$l = \|y - \hat{y}\| + \sum_{l=0}^{N-1} \|Y^{(n)} - \hat{Y}^{(n)}\|,$$

where N is the number of multi-resolution spectrograms. Both the time-domain MAE and the multi-resolution spectrogram MAE may be added to be the objective for optimizing the BS-RoFormer system 105.

In embodiments, during the process of training the BS-RoFormer system 105, audio recordings from different sources may be initially segmented into 8-second audio clips using random cropping on the fly. Subsequently, loudness detection may be applied to discard segments with a loudness level lower than −50 dB. Additionally, random gain may be introduced for each segment, with a range of ±3 dB. To create a single training sample, one segment may be randomly selected for each source from the processed segments described above. Segments from different sources are mixed by linear addition. This random-mixing strategy may produce audio samples that are not musically aligned.

In embodiments, a Hann window size of 2048 and a hop size of 10 milliseconds may be applied to calculate the STFT of 8-second long input signals. For the band-split sub-module 106, the following band-split scheme may be applied: 2 bins per band for frequencies under 1000 Hz, 4 bins per band between 1000 Hz and 2000 Hz, 12 bins per band between 2000 Hz and 4000 Hz, 24 bins per band between 4000 Hz and 8000 Hz, 48 bins per band between 8000 Hz and 16000 Hz, and the remaining bins beyond 16000 Hz equally divided into two bands. This results in a total of 62 bands. The bands are non-overlapping.

In embodiments, the BS-RoFormer system 105 employs a fixed feature dimension of D=384 throughout its architecture. It consists of 12 transformer blocks, each comprising 8 heads with a dropout rate of 0.1. The mask-estimation module may utilize MLPs with a hidden layer dimension of 4D. For training, the AdamW optimizer may be adopted with a learning rate of $4\times10^{-4}$. The number of multi-resolution STFTs N are set to 5 to calculate the mean absolute error (MAE) loss between the time domain ground truth signal y and the predicted signal $\hat{y}$, where the window sizes are set to =[4096, 2048, 1024, 512, 256] with hop sizes of 147.

In embodiments, three models are trained separately for "vocal," "bass" and "drum" with identical setting. To obtain "other," the predictions generated by the aforementioned models may be subtracted from the original mixture. The trainings are conducted using 16 A100 GPUs, with a total batch size of 128. All models may be trained with mixed precision (FP16) to accelerate training and optimize memory usage.

Figure 5:
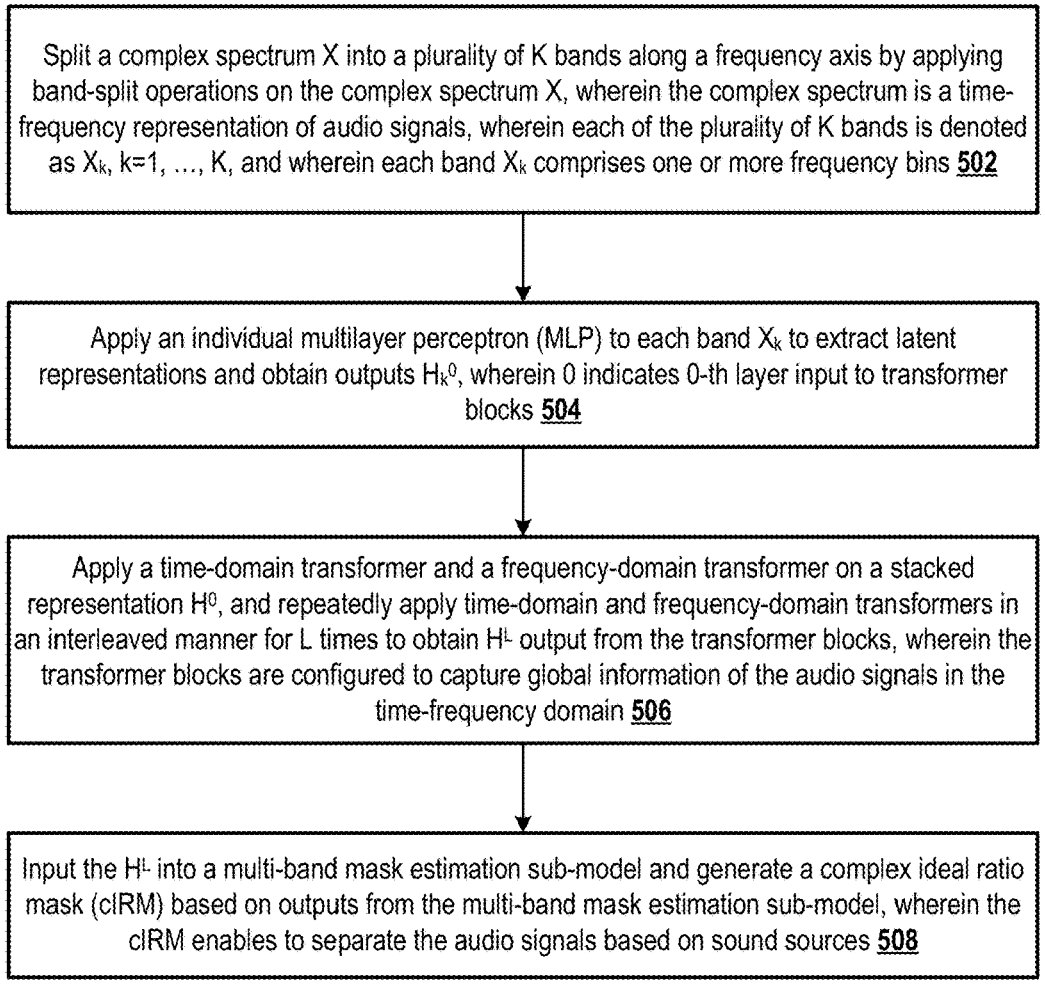
FIG. 5 shows an example process for implementing audio source separation in accordance with the present disclosure.

FIG. 5 illustrates an example process 500 for implementing audio source separation. Although depicted as a sequence of operations in FIG. 5, those of ordinary skill in the art will appreciate that various embodiments may add, remove, reorder, or modify the depicted operations.

A time-frequency representation may be received. The time-frequency representation may not be homogeneous over different frequency bins. For example, the frequency patterns of an instrument in the low frequency bin and an instrument in the high frequency bin may be different. At 502, a complex spectrum X may be split. The complex spectrum X may be split into a plurality of K bands (e.g., K uneven subbands) along a frequency axis. The complex spectrum X may be split by applying band-split operations on the complex spectrum X. The complex spectrum may be a time-frequency representation of audio signals. Each of the plurality of K bands may be denoted as $X_k$, k 1, . . . , K. Each band $X_k$ comprises one or more frequency bins.

At 504, an individual multilayer perceptron (MLP) may be applied to each band $X_k$. The MLP may be applied to each band $X_k$ to extract latent representations and obtain outputs $H_k^0$, wherein 0 indicates the 0-th layer input to transformer blocks. Each MLP layer may comprise a RMSNorm layer followed by a linear layer. Each RMSNorm layer may regularize the summed inputs to a neuron in one layer according to root mean square (RMS), giving the model re-scaling invariance property and implicit learning rate adaptation ability. The output $H_k^0$ may be fed into the transformer blocks.

At 506, a time-domain transformer and a frequency-domain transformer may be applied on a stacked representation $H^0$. Time-domain and frequency-domain transformers may be repeatedly applied in an interleaved manner for L times to obtain $H^L$ output from the transformer blocks. The transformer blocks may be configured to capture global information of the audio signals in the time and frequency domains. In examples, the transformer blocks may comprise a stack of transformer blocks. The stack may comprise L transformer blocks. Each transformer block may comprise a time-domain transformer and the frequency-domain transformer. The stack of L transformer blocks may alternate self-attention computation along the time-axis and the frequency-axis by applying time-domain transformers and frequency-domain transformers in an interleaved manner. In other examples, the transformer blocks may comprise a time-domain transformer and a frequency-domain transformer. The time-domain transformer and the frequency-domain transformer may be applied in an interleaved manner for L times. The final output $H^L$ of the transformer blocks may have a shape of T×K×D and may be fed into a multi-band mask estimation sub-model.

At 508, the $H^L$ may be input into the multi-band mask estimation sub-model. The multi-band mask estimation sub-model may be configured to project each subband representation into corresponding subband frequencies. If two subbands are overlapping, their resulting subband estimations may be averaged. The multi-band mask estimation sub-model may apply K individual MLP layers to the $H^L$. The outputs from the K individual MLP layers may be concatenated along the frequency axis and combined to generate output. The output may comprise a complex ideal ratio mask (cIRM). The cIRM may be generated based on outputs from the multi-band mask estimation sub-model. The cIRM enables to separate the audio signals based on sound sources.

FIG. 6 illustrates an example process 600 for implementing audio source separation. Although depicted as a sequence of operations in FIG. 6, those of ordinary skill in the art will appreciate that various embodiments may add, remove, reorder, or modify the depicted operations.

At 602, a complex ideal ratio mask (cIRM) may be generated. The cIRM may be generated based on outputs from a multi-band mask estimation sub-model. The cIRM enables to separate audio signals based on sound sources. The predicted mask may comprise a cIRM denoted as $\hat{M} \in \mathbb{C}^{C \times T \times F}$ (e.g., $\hat{M}$ with a shape of C×T×F). At 604, at least one separated spectrum may be generated. The at least one separated spectrum may be generated based on multiplying the cIRM by an input spectrum X. The at least one separated spectrum may comprise the separated complex spectrum $\hat{Y}$, where $\hat{Y}=\hat{M}\odot X$. At 606, at least one separated signal in the time domain may be recovered. The at least one separated signal may be recovered by applying an inverse short time Fourier transform (iSTFT) to the at least one separated spectrum. For example, an iSTFT may be applied to $\hat{Y}$ to recover the separated signal $\hat{y}$ in the time domain.

Figure 7:
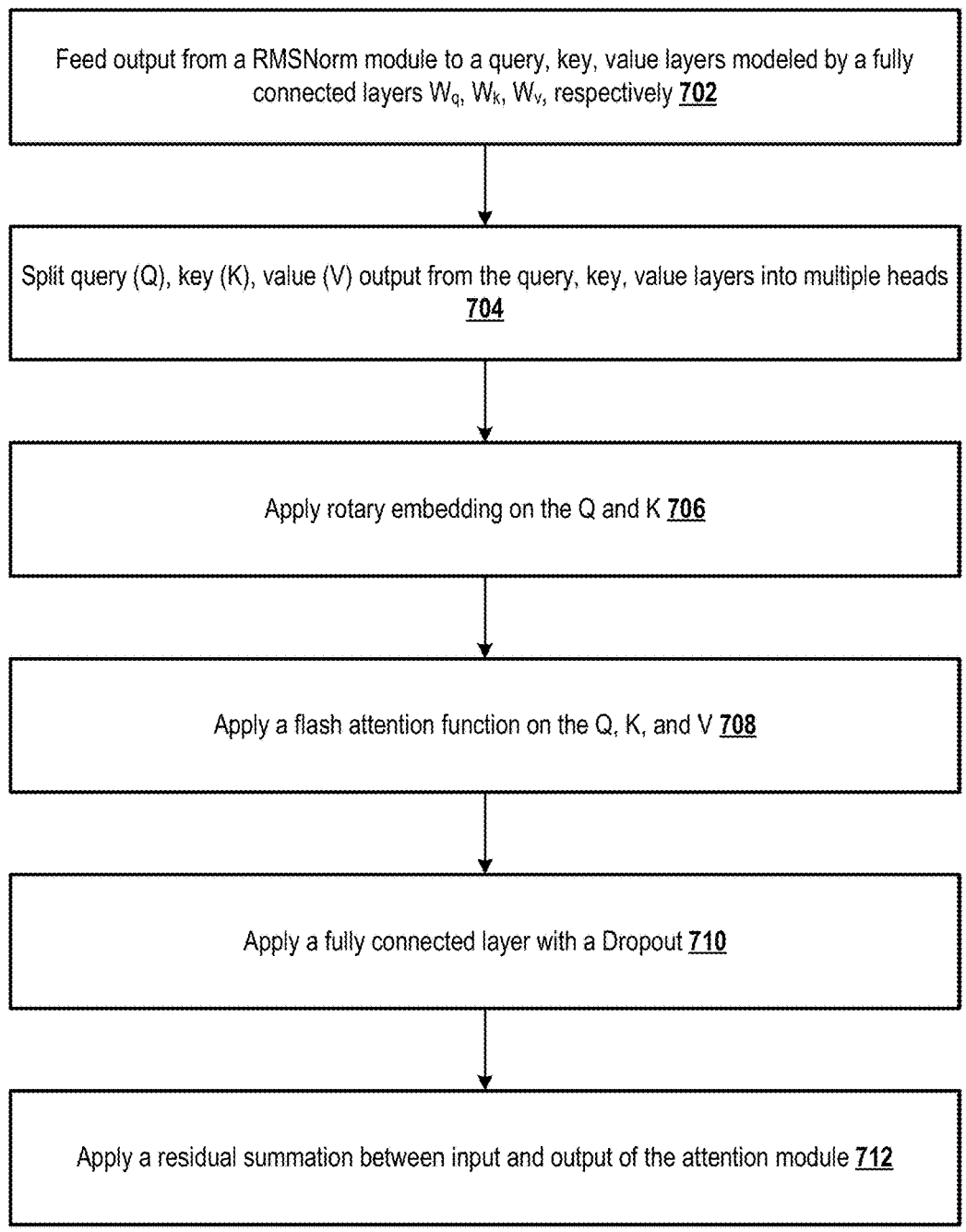
FIG. 7 shows an example process for implemented by a transformer in accordance with the present disclosure.

FIG. 7 illustrates an example process 700 implemented in a transformer layer. Although depicted as a sequence of operations in FIG. 7, those of ordinary skill in the art will appreciate that various embodiments may add, remove, reorder, or modify the depicted operations.

A transformer architecture in accordance with the present disclosure may comprise an attention module and a feedforward module. The attention module may first input the input tensor with a shape of B×L×D into a RMSNorm module. At 702, output from the RMSNorm module may be fed to a query, key, value layers. The query, key, value layers may be modeled by a fully connected layers $W_q$, $W_k$, $W_v$, respectively. The output of the query, key, value layers may be denoted by Q, K, V, respectively. The fully connected layers $W_q$, $W_k$, $W_v$ may all have shapes of D×H, where H is the hidden dimension. Then, Q, K, V' may be split into multiple heads. At 704, query (Q), key (K), value (V) output from the query, key, value layers may be split into multiple heads.

In modeling the spectrogram, the positions of the frequency and time are important, as different time and frequency positions contain different information. To integrate the position information into the BS-RoFormer system, rotary embedding may be used on Q and K. At 706, rotary embedding may be applied on the Q and K. Rotary embedding is a type of position embedding that encodes absolute positional information with rotation matrix and naturally incorporates explicit relative position dependency in self-attention formulation. Rotary embedding has the advantage of capturing both absolute and relative information of the sequence. At 708, a flash attention function may be applied on the Q, K, and V. The flash attention function may be represented as follows:

$$\text{output} = \text{Dropout}\left(\text{Softmax}\left(\frac{QK^T}{\sqrt{d_k}}\right)\right)V.$$

At 710, a fully connected layer with a Dropout may be applied. After building the attention module, at 712, a residual summation may be applied between input and output of the attention module of a transformer that comprises the attention module and a feedforward module. The output of the attention module may be input into the feedforward module of the transformer.

FIG. 8 illustrates an example process 800 for implementing audio source separation. Although depicted as a sequence of operations in FIG. 8, those of ordinary skill in the art will appreciate that various embodiments may add, remove, reorder, or modify the depicted operations.

A time-frequency representation may be received. The time-frequency representation may not be homogeneous over different frequency bins. For example, the frequency patterns of an instrument in the low frequency bin and an instrument in the high frequency bin may be different. At 802, a complex spectrum X may be split. The complex spectrum X may be split into a plurality of K bands (e.g., K uneven subbands) along a frequency axis. The complex spectrum X may be split by applying band-split operations on the complex spectrum X. The complex spectrum may be a time-frequency representation of audio signals. Each of the plurality of K bands may be denoted as $X_k$, k=1, . . . , K. Each band Xx comprises one or more frequency bins.

At 804, an individual multilayer perceptron (MLP) may be applied to each band Xx. The MLP may be applied to each band $X_k$ to extract latent representations and obtain outputs $H_k^0$, wherein 0 indicates the 0-th layer input to transformer blocks. Each MLP layer may comprise a RMS-Norm layer followed by a linear layer. Each RMSNorm layer may regularize the summed inputs to a neuron in one layer according to root mean square (RMS), giving the model re-scaling invariance property and implicit learning rate adaptation ability. The output of each transformed subband may be fed into the transformer blocks.

At 806, a frequency of time positional encodings may be inserted to the transformer blocks such that the transformer blocks are aware of information of different frequency bins. The transformer blocks (e.g., the transformer blocks 108) may be configured to capture global information of the audio signals in the time-frequency domain.

At 808, a time-domain transformer and a frequency-domain transformer may be applied on a stacked representation $H^0$. Time-domain and frequency-domain transformers may be repeatedly applied in an interleaved manner for L times to obtain $H^L$ output from the transformer blocks. In examples, the transformer blocks may comprise a stack of transformer blocks. The stack may comprise L transformer blocks. Each transformer block may comprise a time-domain transformer and the frequency-domain transformer. The stack of L transformer blocks may alternate self-attention computation along the time-axis and the frequency-axis by applying time-domain transformers and frequency-domain transformers in an interleaved manner. In other examples, the transformer blocks may comprise a time-domain transformer and a frequency-domain transformer. The time-domain transformer and the frequency-domain transformer may be applied in an interleaved manner for L times. At 810, the output $H^L$ of the transformer blocks may be fed into a multi-band mask estimation sub-model, e.g., the multi-band mask estimation sub-model 110.

At 812, a complex ideal ratio mask (cIRM) may be generated. The cIRM may be generated by concatenating outputs from the multi-band mask estimation sub-model along the frequency axis. The multi-band mask estimation sub-model comprises K individual MLP layers. Each of the K individual MLP layers may comprise a RMSNorm layer, a fully connected layer followed by a Tan h activation, and a fully connected layer followed by a gated linear unit (GLU) layer. The cIRM enables to separate the audio signals based on sound sources.

In an embodiment, the BS-RoFormer system described herein is trained on the MUSDB18HQ dataset. The BS-RoFormer system was evaluated on the MUSDB18 dataset for comparison against existing MSS systems. The Musdb18HQ dataset contains 100 songs for training. All recordings are stereo and have a sampling rate of 48 KHz. Each recording contains four separate stems, including vocals, bass, drums, and other. Individual separation systems may be trained for each stem. In addition to the MUSDB18HQ dataset, 500 high-quality music pieces were collected (e.g., from the internet). Such high-quality music pieces may herein be referred to as "In-House." The In- House dataset was added to the MUSDB18HQ dataset to investigate the system performance improvement with more training data.

During evaluation of the BS-RoFormer system, the signal-to-distortion ratio (SDR) was used as the evaluation metric. The SDR score is calculated by the following equation:

$$SDR(y, \hat{y}) = 10\log10\frac{\|y\|^2}{\|\hat{s} - s\|^2}$$

A higher SDR indicates better separation quality. FIG. 9 is an example table 900. The table 900 shows the SDR associated with the BS-RoFormer system described herein, as well as the SDR associated with various existing MSS systems. As shown in the table 900, the BS-RoFormer has a higher SDR than the existing MSS systems for vocals, bass, drums, other instruments, and on average. Because a higher SDR indicates a better separation quality, the table 900 shows that the BS-RoFormer is better at audio source separation than existing MSS systems.

Figure 10:
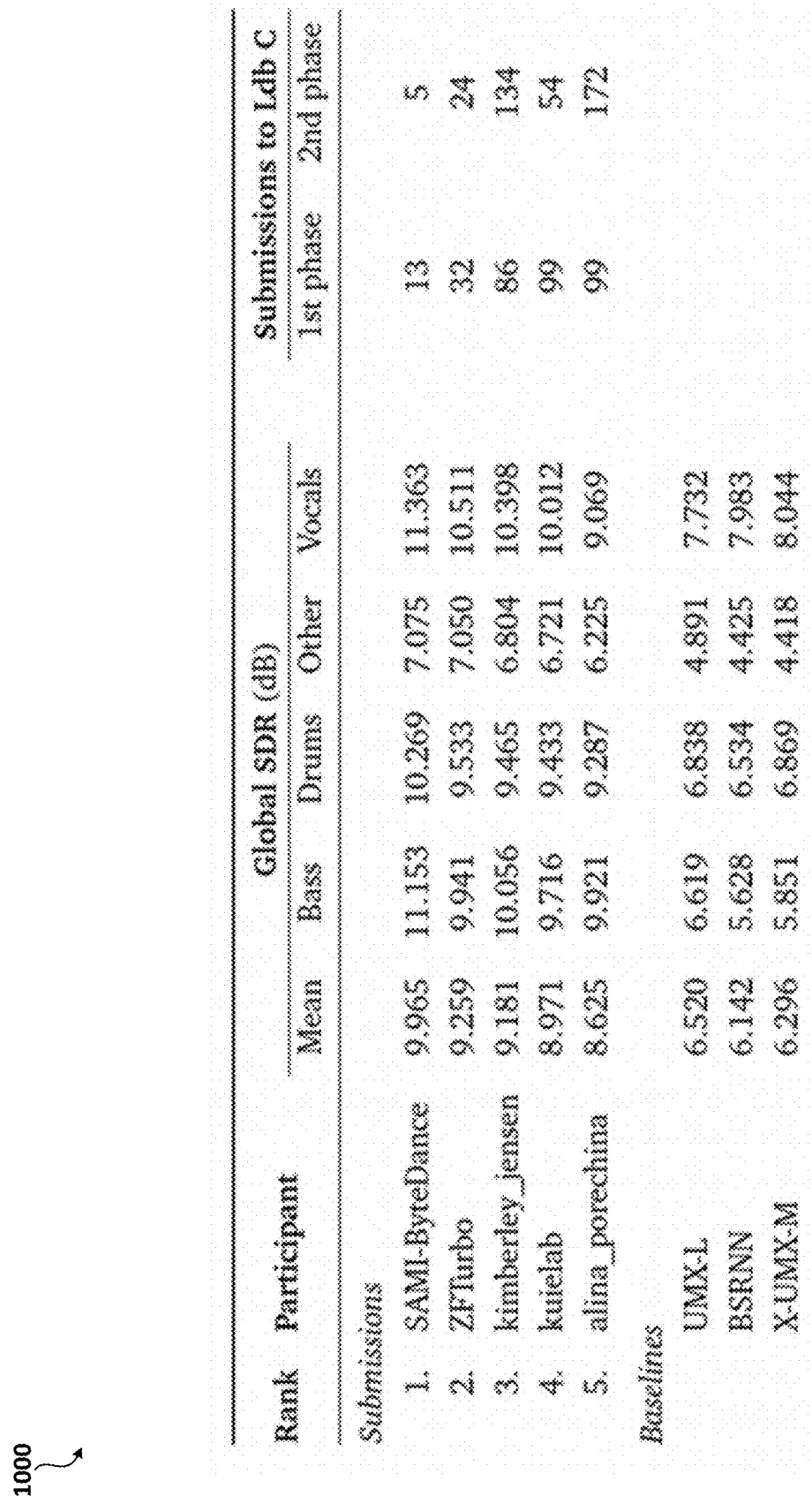
FIG. 10 shows an example table illustrating that the system in accordance with the present disclosure performs better than existing systems.

FIG. 10 shows an example table 1000. The table 1000 shows that the BS-RoFormer system performs better than existing MSS systems. The BS-RoFormer system described herein (termed as SAMI-ByteDance in the table 1000) achieved an average SDR score of 9.965 dB. The SDR score of 9.965 dB is higher than the average SDR score of all other MSS systems depicted in the table 1000. The BS-RoFormer system outperforms the next highest performing MSS system (termed as ZFTurbo in the table 1000) by a large margin. The ZFTurbo achieved an average SDR score of only 9.259 dB.

The BS-RoFormer system described herein addresses the music source separation (MSS) problem. The BS-RoFormer system described herein is a time-frequency domain MSS system and an improvement to the band-split recurrent neural network (BSRNN). The BS-RoFormer system described herein comprises a band-split module, transformer blocks, and a band-combine module. The transformer blocks comprise interleaved transformers along the time and frequency axes. The BS-RoFormer system described herein achieves a state-of-the-art SDR on the MUSDB18 dataset. Time-domain features may additionally be integrated into the BS-RoFormer system for a further improvement over existing MSS systems.

Figure 11:
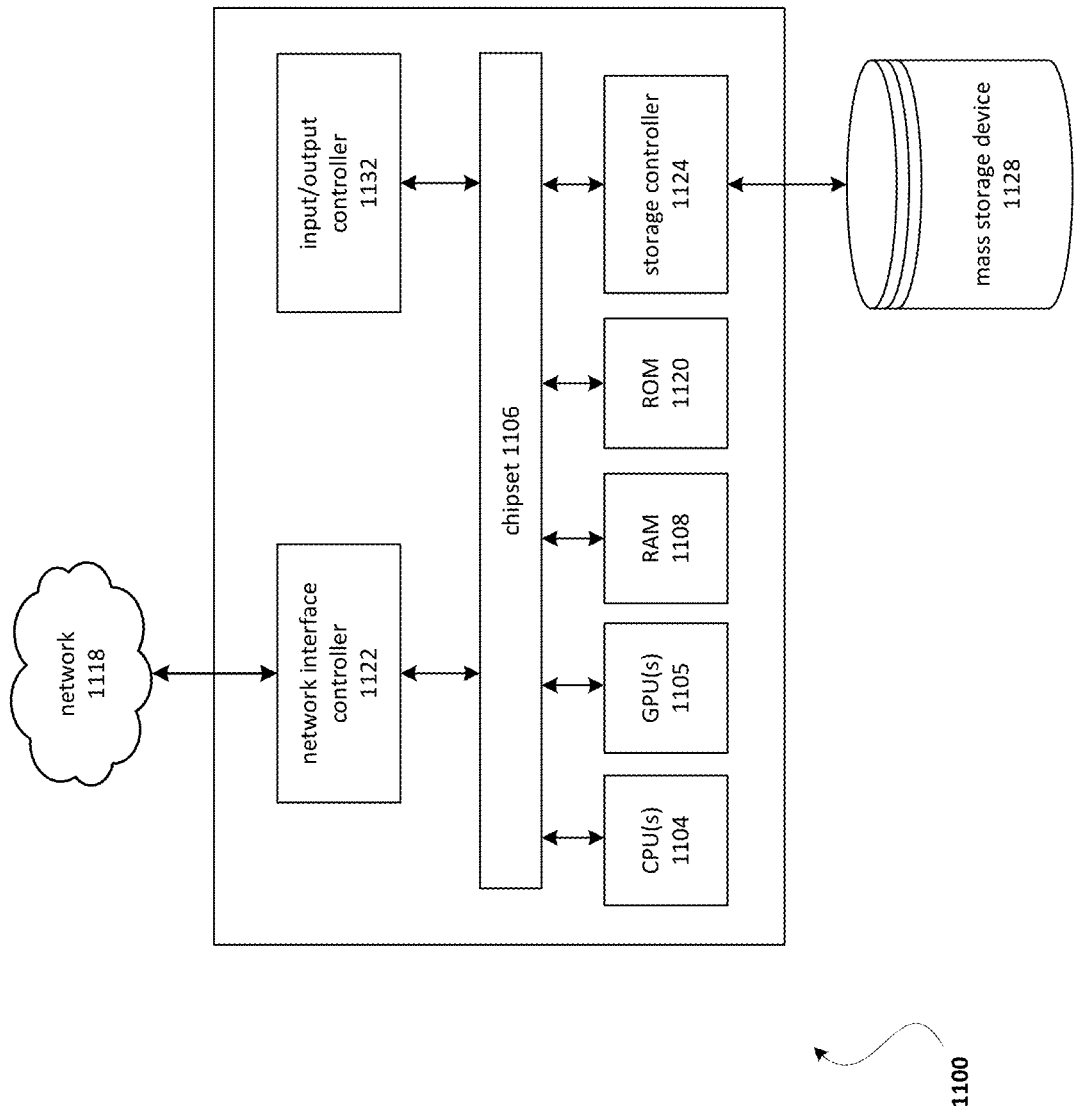
FIG. 11 shows an example computing device which may be used to perform any of the techniques disclosed herein.

FIG. 11 illustrates a computing device that may be used in various aspects, such as the models, modules, and/or devices depicted in FIGS. 1-3. With regard to the example architecture of FIGS. 1-3, any or all of the components may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component 1111. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method for implementing improved audio source separation, comprising:

splitting a spectrum X into a plurality of K bands along a frequency axis by applying band-split operations on the spectrum X, wherein the spectrum is a time-frequency representation of audio signals, wherein each of the plurality of K bands is denoted as $X_k$, k=1, ..., K, and wherein each band $X_k$ comprises one or more frequency bins;

applying an individual multilayer perceptron (MLP) to each band $X_k$ to extract latent representations and obtain outputs $H_k^0$, wherein 0 indicates 0-th layer input to transformer blocks;

applying a time-domain transformer and a frequency-domain transformer on a stacked representation $H^0$, and repeatedly applying time-domain and frequency-domain transformers in an interleaved manner for L times to obtain $H^L$ output from the transformer blocks, wherein the transformer blocks are configured to capture global information of the audio signals in the time-frequency domain;

inputting the $H^L$ into a multi-band mask estimation sub-model and generating a complex ideal ratio mask (cIRM) based on outputs from the multi-band mask estimation sub-model, wherein the cIRM enables to separate the audio signals based on sound sources;

generating at least one separated spectrum based on multiplying the cIRM by the input spectrum X; and recovering at least one separated signal in the time domain by applying an inverse short time Fourier transform (iSTFT) to the at least one separated spectrum.

2. The method of claim 1, further comprising:

inserting frequency of time positional encodings to each transformer such that the transformer blocks are aware of information of different frequency bins.

3. The method of claim 1, wherein each MLP comprises a Root Mean Square Normalization (RMSNorm) layer and a linear layer.

4. The method of claim 1, wherein the multi-band mask estimation sub-model comprises K individual MLP layers, and wherein each of the K individual MLP layer comprises a RMSNorm layer, a fully connected layer followed by a Tanh activation, and a fully connected layer followed by a gated linear unit (GLU) layer.

5. The method of claim 1, further comprising:

generating the cIRM by concatenating outputs from the multi-band mask estimation sub-model along the frequency axis.

6. The method of claim 1, wherein each transformer comprises an attention module and a feedforward module.

7. The method of claim 6, wherein the attention module is configured to perform operations comprising:

feeding output from a RMSNorm module to a query, key, value layers modeled by a fully connected layers $W_q$, $W_k$, $W_v$, respectively;

splitting query (Q), key (K), value (V) output from the query, key, value layers into multiple heads;

applying rotary embedding on the Q and K;

applying a flash attention function on the Q, K, and V;

applying a fully connected layer with a Dropout; and applying a residual summation between input and output of the attention module.

8. The method of claim 6, wherein output from the attention module is fed into the feedforward module, wherein the feedforward module comprises a RMSNorm layer, a fully connected layer with Gaussian Error Linear Unit (GeLU) activation and a dropout, a fully connected layer with a Dropout, and wherein a residual addition is applied between input and output of the feedforward module.

9. A system of implementing improved audio source separation, comprising:

at least one processor; and at least one memory communicatively coupled to the at least one processor and comprising computer-readable instructions that upon execution by the at least one processor cause the at least one processor to perform operations comprising:

splitting a spectrum X into a plurality of K bands along a frequency axis by applying band-split operations on the spectrum X, wherein the spectrum is a time-frequency representation of audio signals, wherein each of the plurality of K bands is denoted as $X_k$, k=1, ..., K, and wherein each band $X_k$ comprises one or more frequency bins;

applying an individual multilayer perceptron (MLP) to each band $X_k$ to extract latent representations and obtain outputs $H_k^0$, wherein 0 indicates 0-th layer input to transformer blocks;

applying a time-domain transformer and a frequency-domain transformer on a stacked representation $H^0$, and repeatedly applying time-domain and frequency-domain transformers in an interleaved manner for L times to obtain $H^L$ output from the transformer blocks, wherein the transformer blocks are configured to capture global information of the audio signals in the time-frequency domain;

inputting the $H^L$ into a multi-band mask estimation sub-model and generating a complex ideal ratio mask (cIRM) based on outputs from the multi-band mask estimation sub-model, wherein the cIRM enables to separate the audio signals based on sound sources;

generating at least one separated spectrum based on multiplying the cIRM by the input spectrum X; and recovering at least one separated signal in the time domain by applying an inverse short time Fourier transform (iSTFT) to the at least one separated spectrum.

10. The system of claim 9, the operations further comprising:

generating the cIRM by concatenating outputs from the multi-band mask estimation sub-model along the frequency axis.

11. The system of claim 9, wherein each transformer comprises an attention module and a feedforward module.

12. The system of claim 11, wherein the attention module is configured to perform operations comprising:

feeding output from a RMSNorm module to a query, key, value layers modeled by a fully connected layers $W_q$, $W_k$, $W_v$, respectively;

splitting query (Q), key (K), value (V) output from the query, key, value layers into multiple heads;

applying rotary embedding on the Q and K;

applying a flash attention function on the Q, K, and V;

applying a fully connected layer with a Dropout; and applying a residual summation between input and output of the attention module.

13. The system of claim 11, wherein output from the attention module is fed into the feedforward module, wherein the feedforward module comprises a RMSNorm layer, a fully connected layer with Gaussian Error Linear Unit (GeLU) activation and a dropout, a fully connected layer with a Dropout, and wherein a residual addition is applied between input and output of the feedforward module.

14. A non-transitory computer-readable storage medium, storing computer-readable instructions that upon execution by a processor cause the processor to implement operations comprising:

splitting a spectrum X into a plurality of K bands along a frequency axis by applying band-split operations on the spectrum X, wherein the spectrum is a time-frequency representation of audio signals, wherein each of the plurality of K bands is denoted as $X_k$, k=1, ..., K, and wherein each band $X_k$ comprises one or more frequency bins;

applying an individual multilayer perceptron (MLP) to each band $X_k$ to extract latent representations and obtain outputs $H_k^0$, wherein 0 indicates 0-th layer input to transformer blocks;

applying a time-domain transformer and a frequency-domain transformer on a stacked representation $H^0$, and repeatedly applying time-domain and frequency-domain transformers in an interleaved manner for L times to obtain $H^L$ output from the transformer blocks, wherein the transformer blocks are configured to capture global information of the audio signals in the time-frequency domain;

inputting the $H^L$ into a multi-band mask estimation sub-model and generating a complex ideal ratio mask (cIRM) based on outputs from the multi-band mask estimation sub-model, wherein the cIRM enables to separate the audio signals based on sound sources;

generating at least one separated spectrum based on multiplying the cIRM by the input spectrum X; and recovering at least one separated signal in the time domain by applying an inverse short time Fourier transform (iSTFT) to the at least one separated spectrum.

15. The non-transitory computer-readable storage medium of claim 14, the operations further comprising:
generating the cIRM by concatenating outputs from the multi-band mask estimation sub-model along the frequency axis.

16. The non-transitory computer-readable storage medium of claim 14, wherein each transformer comprises an attention module and a feedforward module.

17. The non-transitory computer-readable storage medium of claim 16, wherein the attention module is configured to perform operations comprising:
feeding output from a RMSNorm module to a query, key, value layers modeled by a fully connected layers $W_q$, $W_k$, $W_v$, respectively;
splitting query (Q), key (K), value (V) output from the query, key, value layers into multiple heads;
applying rotary embedding on the Q and K;
applying a flash attention function on the Q, K, and V;
applying a fully connected layer with a Dropout; and
applying a residual summation between input and output of the attention module.

* * * * *